(12) United States Patent
Isgar (10) Patent No.: US 11,727,359 B2
(45) Date of Patent: *Aug. 15, 2023

(54) VOLUNTEER REPORTING SYSTEM

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/665,948

(22) Filed: Feb. 7, 2022

(65) Prior Publication Data

US 2022/0156700 A1    May 19, 2022

Related U.S. Application Data (63) Continuation of application No. 17/157,020, filed on Jan. 25, 2021, now Pat. No. 11,244,286.

(60) Provisional application No. 62/965,258, filed on Jan. 24, 2020.

(51) Int. Cl.
| | |
|---|---|
| *G06Q 10/1091* | (2023.01) |
| *H04W 4/021* | (2018.01) |
| *H04W 12/06* | (2021.01) |
| *H04W 4/029* | (2018.01) |
| *H04W 4/02* | (2018.01) |
| *H04Q 9/00* | (2006.01) |

(52) U.S. Cl.
CPC ........ *G06Q 10/1091* (2013.01); *H04W 4/021* (2013.01); *H04W 4/023* (2013.01); *H04W 4/029* (2018.02); *H04W 12/06* (2013.01)

(58) Field of Classification Search
CPC .. G06Q 10/1091; H04W 4/021; H04W 4/023; H04W 4/029; H04W 12/06; H04W 12/61; H04W 12/63

USPC .......................................................... 705/32
See application file for complete search history.

(56) References Cited

U.S. PATENT DOCUMENTS

| | | | | |
|---|---|---|---|---|
| 6,150,955 | A | * | 11/2000 | Tracy ...................... H04Q 9/00 340/870.02 |
| 9,020,848 | B1 | | 4/2015 | Ridge et al. |
| 2007/0282661 | A1 | | 12/2007 | Franco |

(Continued)

OTHER PUBLICATIONS

Morrell, Hermes Rolls Our SafePlace Photo and Geofencing Service Following Trial, Sep. 6, 2018, https://edelivery.net/2018/09/hermes-rolls-safeplace-photo-geofencing-service-following-trial/, accessed May 31, 2022.

(Continued)

*Primary Examiner* — Garcia Ade
(74) *Attorney, Agent, or Firm* — Schmeiser, Olsen & Watts LLP (57) ABSTRACT

A volunteer reporting system is provided. The system includes a computer server having a memory storing organization data and user data and a user computing device coupled to the computer server. The computer server may be programmed to automatically determine an accumulated amount of time the user computing device has been within the proximity zone during a designated period of time less the time the user computing device is outside of the proximity zone until within the proximity zone and sensed and the server receives another signal during the designated period of time. Additionally, the system may generate a report of the location, time and accumulated amount of time the user computing device was within the proximity zone in response to receiving a request for the report.

13 Claims, 8 Drawing Sheets

(56) References Cited

U.S. PATENT DOCUMENTS

| | | | |
|---|---|---|---|
| 2012/0064920 A1* | 3/2012 | Shaw | H04W 4/02 |
| | | | 455/456.4 |
| 2012/0172027 A1* | 7/2012 | Partheesh | H04M 1/72415 |
| | | | 455/420 |
| 2016/0012410 A1 | 1/2016 | Hanson et al. | |
| 2016/0117643 A1 | 4/2016 | Bittle | |
| 2019/0370871 A1 | 12/2019 | Isgar | |
| 2020/0043055 A1 | 2/2020 | Olds et al. | |

OTHER PUBLICATIONS

Isgar, Volunteer Reporting System and Connection System, Patent Cooperation Treaty Application Serial No. PCT/US22/13717, filed on Jan. 25, 2022, International Search Report and Written Opinion dated Mar. 3, 2022.

* cited by examiner

VOLUNTEER REPORTING SYSTEM

CROSS REFERENCE TO RELATED APPLICATION

This application is a continuation of U.S. Patent Application to Charles Isgar entitled "VOLUNTEER REPORTING SYSTEM," Ser. No. 17/157,020, filed Jan. 25, 2021, which claims priority to U.S. Provisional Patent Application to Charles Isgar entitled "VOLUNTEER REPORTING SYSTEM," Ser. No. 62/965,258, filed Jan. 24, 2020, the disclosure of which is hereby incorporated entirely herein by reference.

BACKGROUND OF THE INVENTION

Technical Field

This invention relates generally to a charitable volunteer system, and more particularly to a volunteer reporting system for providing reporting and aggregation of volunteer time and location of service on behalf of an organization or the like.

State of the Art

Organizations and individuals have no system that allows for easy tracking and reporting of volunteer hours, location and time at the organization in a volunteer capacity. Organizations historically have various ways of collecting such information. For example, one way is to have a sign in sheet for individuals to sign and indicate that he or she is volunteering. This system has significant drawbacks, such as a lack of accounting for all time at the location the individual is supposed to be at for the volunteered amount of time. Conventional systems are required to utilize ineffective and inaccurate forms of accounting of volunteer hours of service. With the wide adoption of smart devices utilized by volunteers a new system is needed to recognize the hours and commitment of their individual volunteers or group of volunteers.

Accordingly, there is a need for an improved system for collecting volunteer hours.

DISCLOSURE OF THE INVENTION

The present invention relates to a volunteer reporting system that verifies a volunteer's location to perform charity work, time that the volunteer is performing charity work, cumulative hours of charity work for a predetermined period of time and generates reports regarding the same.

A volunteer reporting system is disclosed comprising: a computer server having a memory storing organization data of an organization and user data of a user; and a user computing device of the user coupled to the computer server, the computer server programmed to: generate and establish a proximity zone at a specified geo-location; receive a first signal from the user computing device that the user computing device has entered the proximity zone and store in the memory of the server a time and date the user computing device entered the proximity zone; automatically establish a connection between the server and the user computing device in response to the user computing device entering the proximity zone; automatically generate and send for display on the user computing device a volunteer interface that includes a message indicating the user computing device has entered the proximity zone; automatically determine an accumulated amount of time the user computing device has been within the proximity zone during a designated period of time less the time the user computing device is outside of the proximity zone until within the proximity zone and sensed and the server receives a second signal during the designated period of time; and generate a report of the location, time and accumulated amount of time the user computing device is within the proximity zone in response to receiving a request for the report.

The report may be requested by the organization. The user data may be reported to the server and retrieved by the organization with user permission. The organization may be a charitable organization. The user computing device may comprise a timer thereby allowing the user to manually start and stop the timer within the proximity zone. The user computing device may comprise a camera for authenticating the user is within the proximity zone. The organization data may comprise verification information that the organization is registered with the system. The user data may comprise name and contact information of the user. The contact information may comprise address, email and/or phone number. The volunteer reporting system may comprise more than one of the user computing device. The organization may track how many of the more than one user computing device are within the proximity zone. The user may be affiliated with a group or team. The computer server may automatically send verification to the user computing device in response to the user computing device entering the proximity zone that the organization is legitimate.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a volunteer reporting system that verifies volunteer's location to perform charity work, time that the volunteer is performing charity work, cumulative hours of charity work for a predetermined period time and generates reports regarding the same.

Volunteers are often unrecognized. Embodiments of this system may be utilized to recognize and reward commitment to charitable work. Embodiment may be utilized to account for cumulative hours volunteered/worked and can be utilized by an organization such as school to track how the organization meets individual and team goals of volunteering. Additionally, embodiments may be utilized to match the volunteer hours with the individual hours worked and can be used for validation of service rendered by the volunteers.

While some embodiments automate the tracking and validation processes, some embodiments operate for just reporting hours worked without GPS or location because it is still a useful option for some organization. Accordingly, some volunteer organization may benefit from this system as self-reporting and not have sophisticated tracking. In such embodiments, the system may operate to keep aggregated hours worked for individuals, teams and organizations and then allow for reporting of the same by each volunteer as part of the aggregation system.

Figure 1:
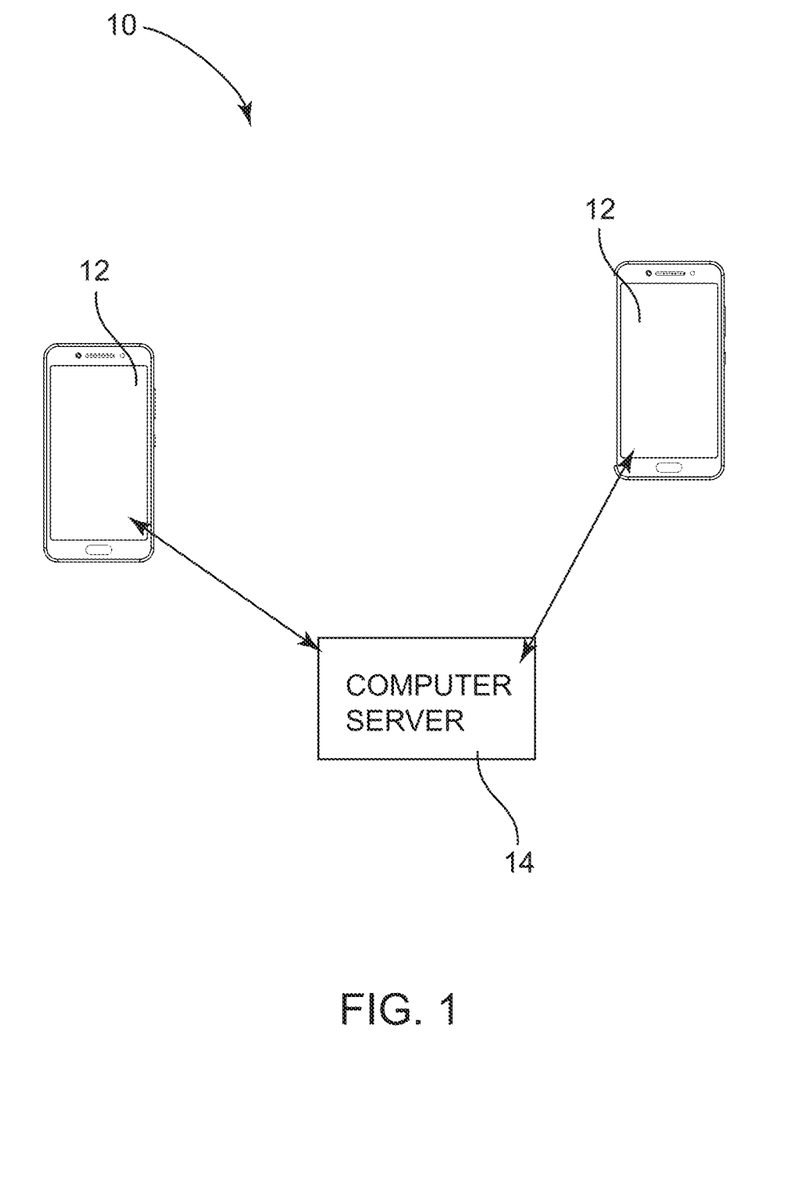
FIG. 1 is a diagrammatic view of a volunteer reporting system in accordance with an embodiment.

Referring to the drawings, FIG. 1 depicts an embodiment of a charitable donation system 10. The system 10 may include user (volunteer) computing devices 12 coupled to a computer server 14. This coupling may be a network connection, such as through an Internet connection, wherein the user computing devices 12 may communicate with and receive communication from the server 14. In embodiments, the user computing device 12 may be, without limitation, a smartphone, or the like.

Figure 6:
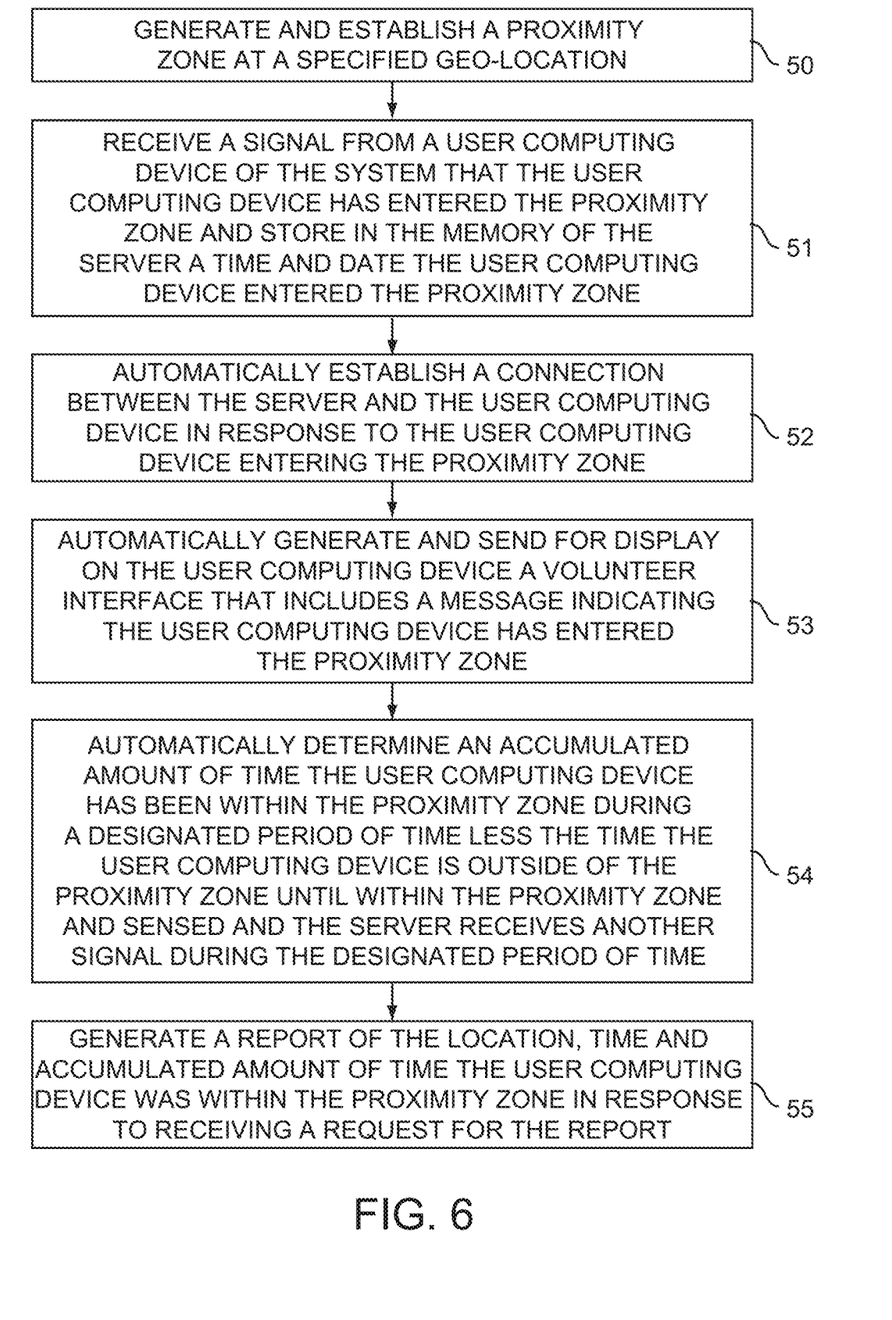
FIG. 6 is a flow chart of programmed steps of a computer server of a volunteer reporting system in accordance with an embodiment.

The computer server 14 may include a memory storing organization data corresponding to various organizations and user data. The organization data includes verification information that the organizations are registered with the system 10. The user data may include name, contact information including address, email and phone number, and the like for the user of a user computing device 12 of the system 10. A user computing device 12 may be coupled to the computer server 14, and, referring additionally to FIG. 6, the computer server 14 may be programmed to generate and establish a proximity zone 18 at a specified geo-location (Step 50); receive a signal from a user computing device 12 of the system 10 that the user computing device 12 has entered the proximity zone 18 and store in the memory of the server 14 a time and date the user computing device 12 entered the proximity zone 18 (Step 51); automatically establish a connection between the server 14 and the user computing device 12 in response to the user computing device 12 entering the proximity zone 18 (Step 52); automatically generate and send for display on the user computing device 12 a volunteer interface 50 that includes a message indicating the user computing device 12 has entered the proximity zone 18 (Step 53); automatically determine an accumulated amount of time the user computing device 12 has been within the proximity zone 18 during a designated period of time less the time the user computing device 12 is out of the proximity zone 18 until within the proximity zone 18 and sensed and the server receives another signal during the designated period of time (Step 54); and generate a report of the location, time and accumulated amount of time the user computing device 12 was within the proximity zone 18 in response to receiving a request for the report (Step 55).

The proximity zone 18 may be a predetermined size, such as a radius or space located at a geographical location or geo-location. The size of the proximity zone 18 may be determined by the server 14 and correlates to the organization utilizing the system 10. The proximity zone 18 may include, but is not limited to a geofence, a Wi-Fi signal quadrant, such as a 5G Wi-Fi signal quadrant, or any other means of establishing a proximity zone.

The computer server 14 may further be programmed to verify the organization as legitimate and communicate the verification to the user computing device 12 in response to the user computing device accessing the system within the proximity zone 18. In some embodiments, the computer server 14 is further programmed to automatically verify the charitable organization as legitimate and communicate the verification to the user computing device 12 in response to the user computing device 12 entering the proximity zone 18. An organization such as, but not limited to, a charitable organization may register with the system 10, and the system may verify the charitable organization as legitimate and store the verification in memory on the server 14. Accordingly, the computer server 14 may be programmed to access its memory to determine or verify if the charitable organization associated with the proximity zone(s) 18 is legitimate and to verify that the proximity zone(s) 18 is legitimately associated with the charitable organization, wherein the server 14 receives an identification of the proximity zone(s) 18 when the proximity zone(s) 18 are activated and confirms that the identification of proximity zone(s) 18 is assigned to the charitable organization. In at least this way, there is a two-step verification of verifying the charitable organization as legitimate and verifying that the proximity zone 18 is associated or assigned to that legitimate charitable organization.

Figure 2:
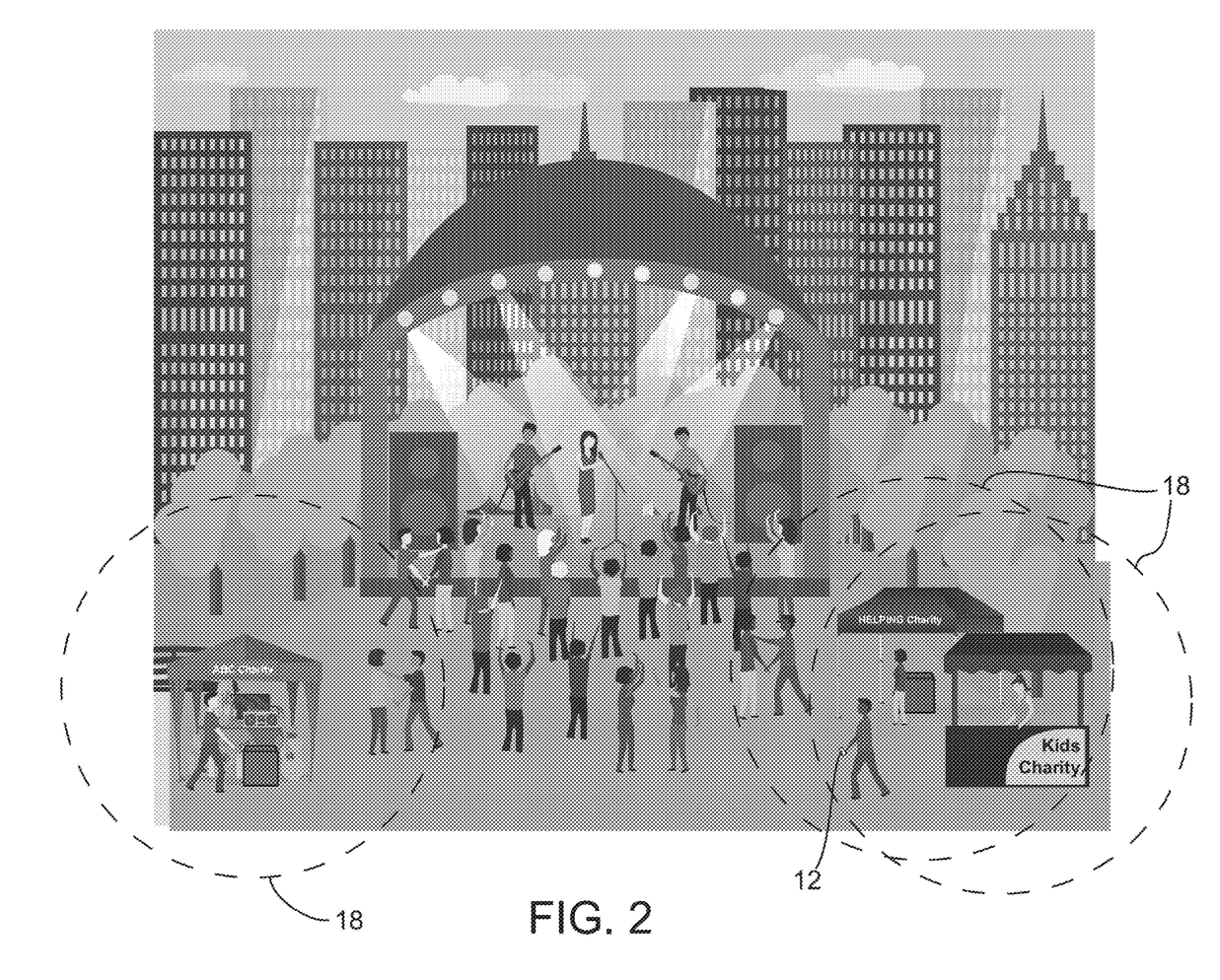
FIG. 2 is a view of volunteers using the volunteer reporting system at a charitable event in accordance with an embodiment.

FIGS. 2-4C depict a volunteer reporting system 10 in operation. FIG. 2 depicts an event that may include several charities/businesses that are registered with the system 10, such as, without limitation, ABC Charity, HELPING Charity and Kids charity as depicted in FIG. 2, with a closer view of similar scenario depicted in FIG. 3. The user computing device 12 operated by a volunteer to enter a proximity zone 18 associated with one of the various businesses/charities.

Figure 3:
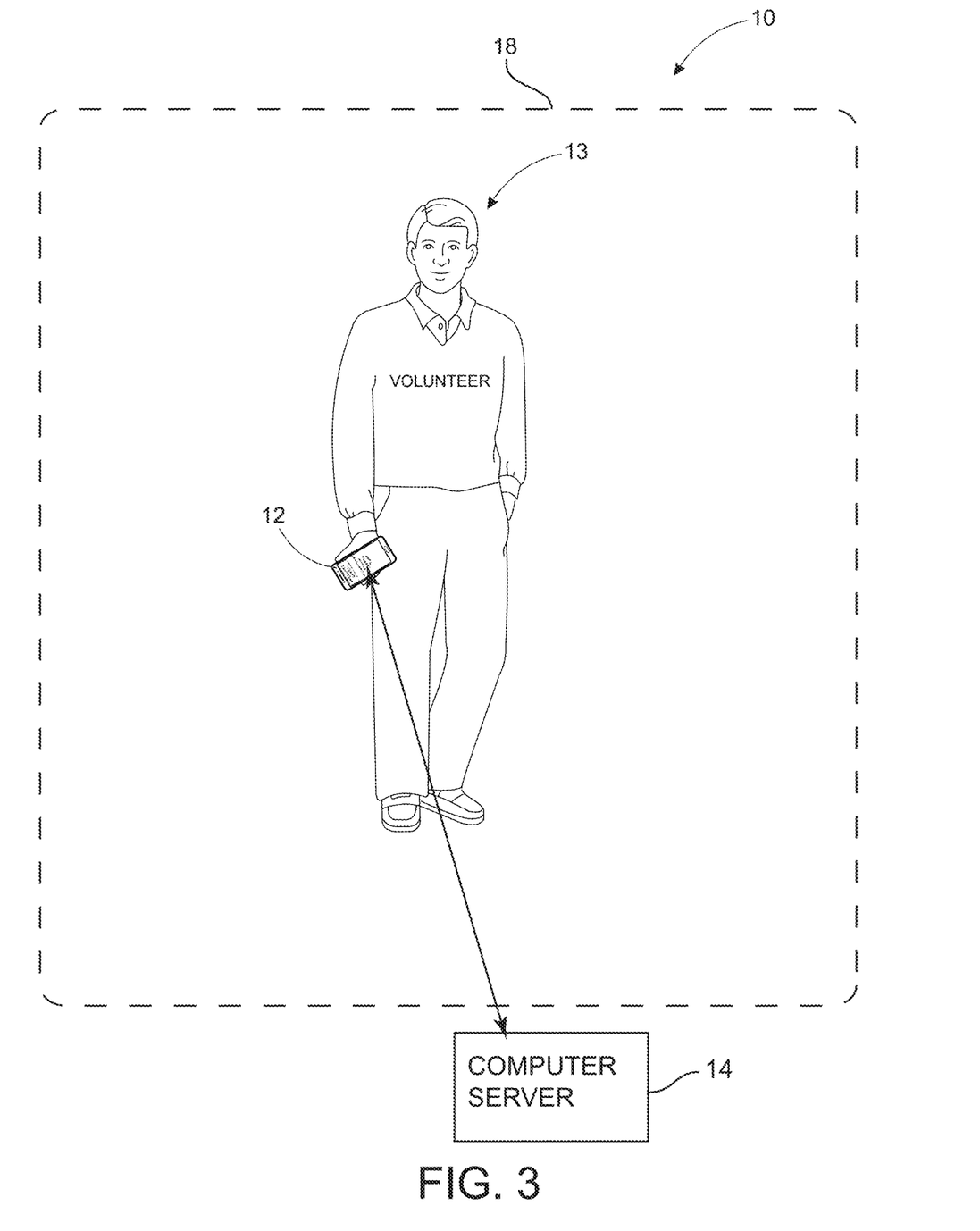
FIG. 3 is a view of a volunteer using the volunteer reporting system in accordance with an embodiment.
Figure 4A:
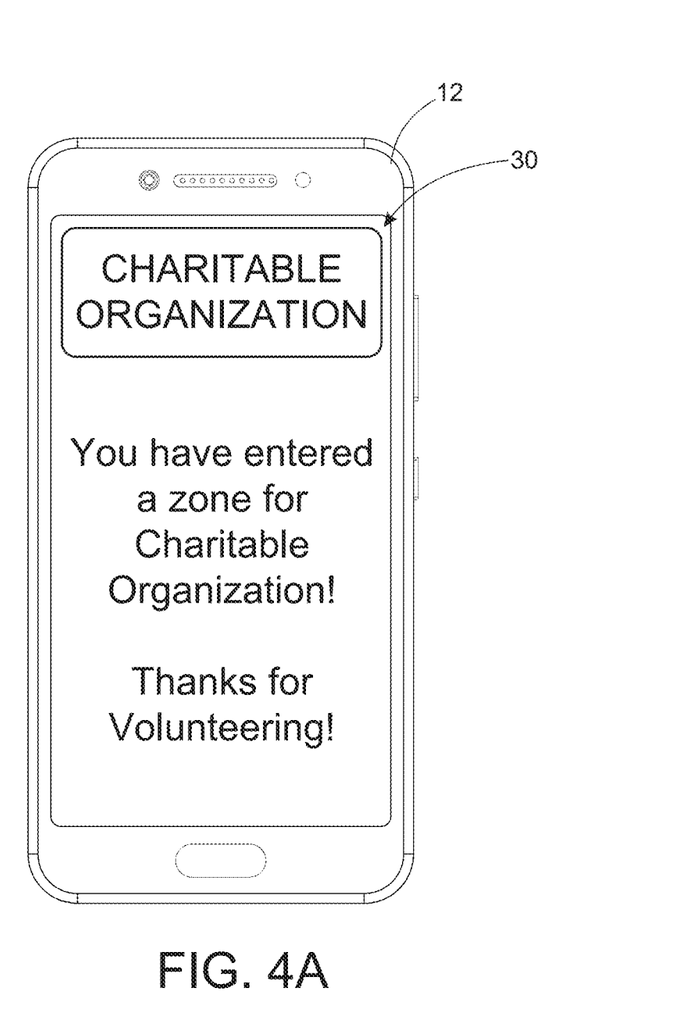
FIG. 4A is a view of a mobile computing device operating as part of a volunteer reporting system in accordance with an embodiment.
Figure 4B:
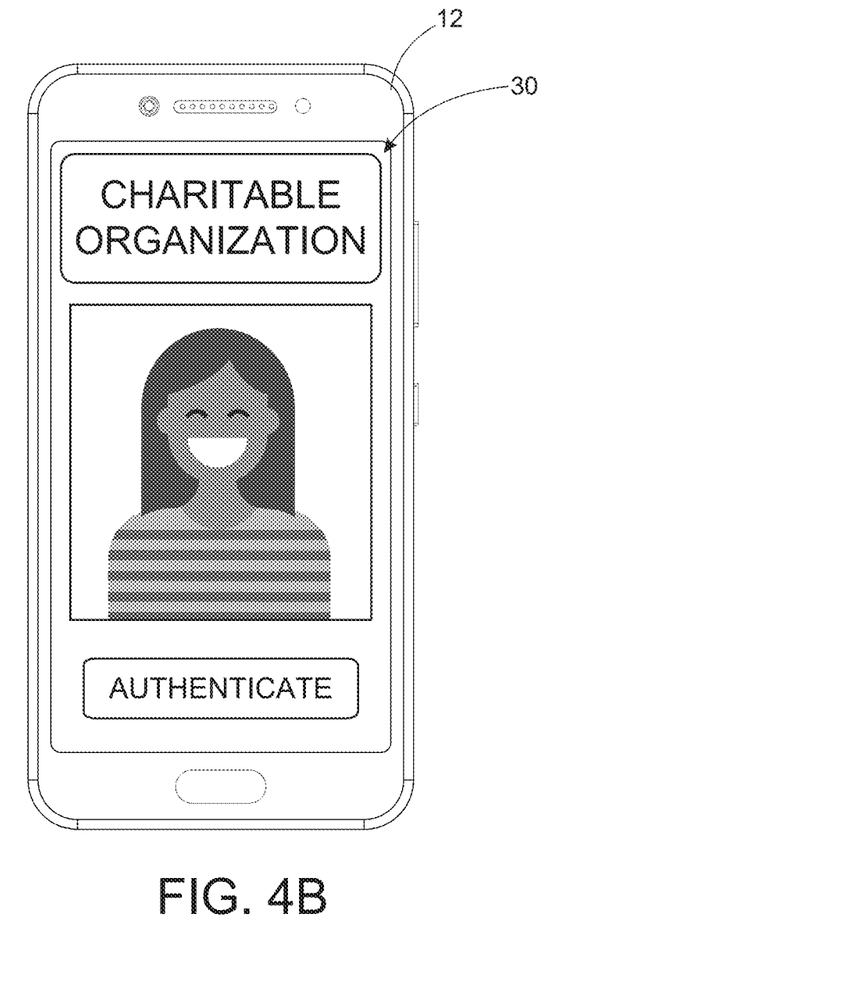
FIG. 4B is a view of a mobile computing device operating to authenticate a location of the volunteer as part of a volunteer reporting system in accordance with an embodiment.
Figure 4C:
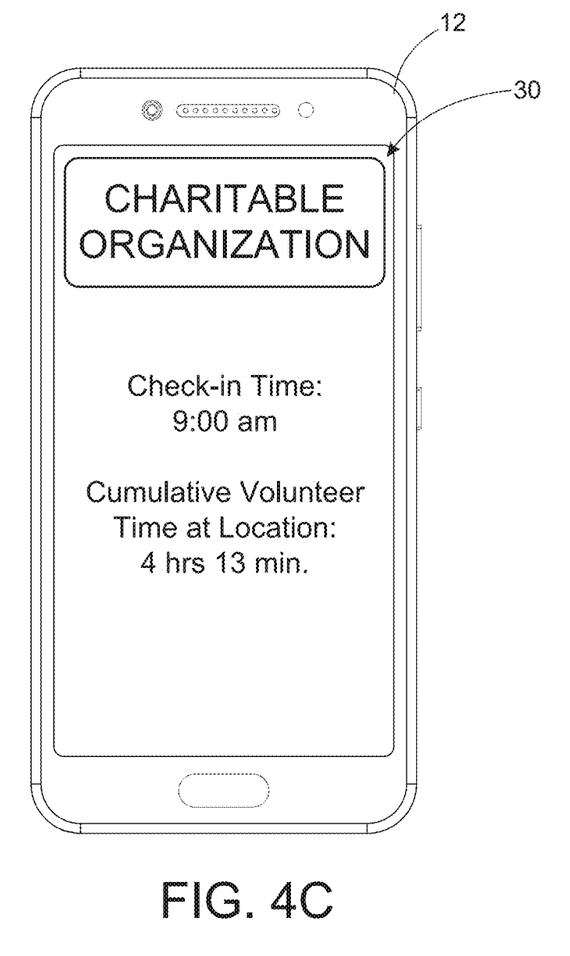
FIG. 4C is a view of a mobile computing device operating to depict volunteer time as part of a volunteer reporting system in accordance with an embodiment.

FIG. 3 shows user volunteer) 13 with user computing device 12 operating a volunteer application 30, the user computing device 12 within the proximity zone 18. The user computing device 12 sends a signal to the server 14 indicating that the user computing device 12 is within the proximity zone 18 and a connection is established between the user computing device with the server 14 for communication therebetween. The date and time the user computing device 12 is within the proximity zone may be recorded and stored on the server 14. The server 14 may deliver a message to the user computing device through the connection to verify that the organization is legitimate and confirms such with the message on the user computing device 12, as shown in FIG. 4A. In embodiments, the system 10 may allow or may require the volunteer to authenticate she is at the location within the proximity zone 18. This may be done for example by taking a photo or video of herself using a camera on the user computing device 12 and submitting for authentication as shown in FIG. 4B. This photo or video may include a geo-location metadata that can verify or authenticate that the volunteer is actually in the proximity zone 18. This may be utilized to avoid someone sending in his or her mobile device 12 with someone else into the proximity zone 18 to register volunteer time without actually volunteering.

Throughout a predetermine amount of time, such as, but not limited to, a day, the user computing device 12 may be within and outside of the proximity zone 18 such as for breaks, like lunch breaks. The server 14 may be programmed to determine the amount of time the user computing device is within the proximity zone 18 and records the amount of time between each entry into the proximity zone until and exit from the proximity zone and records the amount of time on the server associated with the user as part of the user data. This is performed for each instance that the user computing device 12 enters within the proximity zone 18. With reference to FIG. 4B, for example, and without limitation, the system 10 may record the time entered within the proximity zone 18 and depict it as a "Check-in Time" for example. The server 14 may also aggregate all of the time the user computing device 12 is within the proximity zone 18 for a predetermine time period and depict the same on the user computing device 12. The aggregation of time may include all time within the proximity zone 18 less any amount of time the user computing device exited the proximity zone 18, see FIG. 4C. Further, because the proximity zone 17 operates to the determine location of the volunteer area, the user computing devices 12 may also include the use of a location device, like a GPS device to determine that the user is within the proximity zone 18. The server operates to record this location and store in the user data on the server 14.

Figure 5:
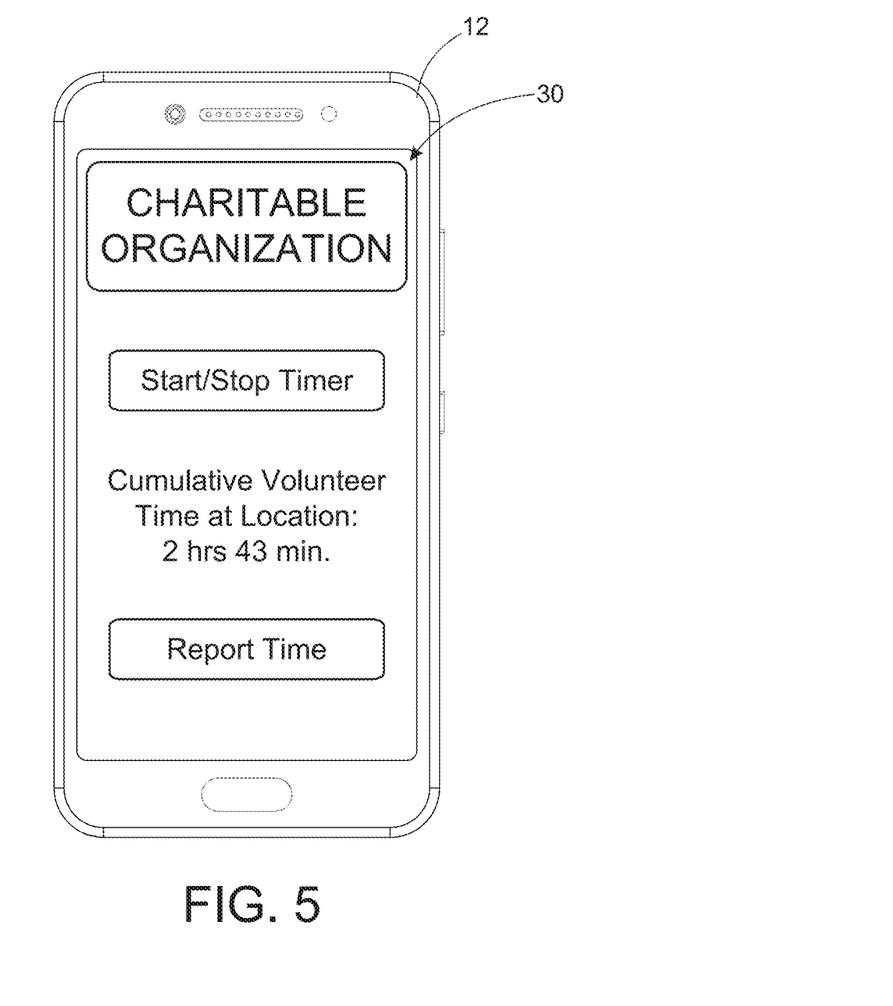
FIG. 5 is a view of a mobile computing device operating for self-reporting of volunteer time as part of a volunteer reporting system in accordance with an embodiment.

Further still, in some embodiments, as depicted in FIG. 5, the system may allow the volunteer to utilize a user computing device 12 to start and stop time the user is volunteering, thereby allowing the volunteer to manually start and stop a timer to account for the time the volunteer is in the act of work in behalf of an organization. The user computing device may then allow the user to report the accumulated volunteer hours to the server 14 for storing in the memory of the server 14 in order to aggregate all of the volunteer time corresponding to the organization.

All of this data may be reported to a server and be retrieved with user permission by the charity volunteered for, a family group, school program, workplace volunteer campaign and the like. This helps to verify the amount of time the user actually volunteers and provides an auditable database of information associated with volunteer hours in order to have more accurate accounting and recording of the same. The report may be made by any approved individual or entity that has access to the system 10.

Embodiments may be available on or through the internet, such as through domain names reserved and owned by Applicant that include helping-hours.com, good-hours.com, hours-report.com, hearthours.com, helping-time.com, volunteer-friend.com, volunteerclock.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur outside of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A volunteer reporting system comprising:
a computer server having a memory storing organization data of an organization and user data of a user; and
a user computing device of the user coupled to the computer server, the computer server programmed to:
generate and establish a proximity zone at a specified geo-location comprising a geofence;
receive a first signal from the user computing device that the user computing device has entered the proximity zone and store in the memory of the server a time and date the user computing device entered the proximity zone;
automatically establish a connection between the server and the user computing device in response to the user computing device entering the proximity zone;
automatically determine an accumulated amount of time the user computing device has been within the proximity zone during a designated period of time less the time the user computing device is outside of the proximity zone until within the proximity zone and sensed and the server receives a second signal during the designated period of time; and
generate a report of the location, time and accumulated amount of time the user computing device is within the proximity zone in response to receiving a request for the report.

2. The volunteer reporting system of claim 1, wherein the report is requested by the organization.

3. The volunteer reporting system of claim 1, wherein the user data is reported to the server and retrieved by the organization with user permission.

4. The volunteer reporting system of claim 1, wherein the organization is a charitable organization.

5. The volunteer reporting system of claim 1, wherein the user computing device comprises a timer thereby allowing the user to manually start and stop the timer within the proximity zone.

6. The volunteer reporting system of claim 1, wherein the user computing device comprises a camera for authenticating the user is within the proximity zone.

7. The volunteer reporting system of claim 1, wherein the organization data comprises verification information that the organization is registered with the system.

8. The volunteer reporting system of claim 1, wherein the user data comprises name and contact information of the user.

9. The volunteer reporting system of claim 8, wherein the contact information comprises address, email and/or phone number.

10. The volunteering reporting system of claim 1, further comprising more than one of the user computing device.

11. The volunteer reporting system of claim 10, wherein the organization tracks how many of the more than one user computing device are within the proximity zone.

12. The volunteer reporting system of claim 1, wherein the user is affiliated with a group or team.

13. The volunteer reporting system of claim 1, wherein the computer server automatically sends verification to the user computing device in response to the user computing device entering the proximity zone that the organization is legitimate.

* * * * *